(12) United States Patent
Dietzel

(10) Patent No.: US 10,358,855 B2
(45) Date of Patent: Jul. 23, 2019

(54) LINEAR DRIVE FOR AN ADJUSTMENT ELEMENT OF A MOTOR VEHICLE

(71) Applicant: Brose Fahrzeugteile GmbH & Co. KG, Bamberg, Bamberg (DE)

(72) Inventor: Renee Dietzel, Sonnefeld (DE)

(73) Assignee: Brose Fahrzeugteile GmbH & Co. KG, Bamberg, Bamberg (DE)

( * ) Notice: Subject to any disclaimer, the term of this patent is extended or adjusted under 35 U.S.C. 154(b) by 136 days.

(21) Appl. No.: 15/307,583

(22) PCT Filed: Mar. 12, 2015

(86) PCT No.: PCT/EP2015/055210
§ 371 (c)(1),
(2) Date: Jan. 17, 2017

(87) PCT Pub. No.: WO2015/165635
PCT Pub. Date: Nov. 5, 2015

(65) Prior Publication Data
US 2017/0114580 A1    Apr. 27, 2017

(30) Foreign Application Priority Data
Apr. 29, 2014 (DE) .................. 10 2014 105 956

(51) Int. Cl.
*F16C 11/06* (2006.01)
*E05F 1/10* (2006.01)
(Continued)

(52) U.S. Cl.
CPC ............ *E05F 1/105* (2013.01); *E05F 1/1058* (2013.01); *E05F 15/622* (2015.01); *F16C 11/06* (2013.01);
(Continued)

(58) Field of Classification Search
CPC ...... F16C 11/06; F16C 33/20; F16C 2361/41; E05F 1/105; E05F 1/1058; E05F 1/622;
(Continued)

(56) References Cited

U.S. PATENT DOCUMENTS 4,084,913 A * 4/1978 Schenk ............... F16C 11/0657
403/141
4,499,785 A * 2/1985 Bennett .................... F16C 1/14
403/141
(Continued)

FOREIGN PATENT DOCUMENTS

DE    4228383    3/1994
DE    202011109569    3/2012
(Continued)

OTHER PUBLICATIONS

"International Search Report & Written Opinion," for PCT/EP2015/055210, dated Jun. 12, 2015 (9 pages), English translation.
(Continued)

*Primary Examiner* — Phillip A Johnson
(74) *Attorney, Agent, or Firm* — Pauly, DeVries Smith & Deffner LLC

(57) ABSTRACT

The disclosure relates to a linear drive for an adjustment element of a vehicle, with a drive train for generating a driving force along a geometrical drive axis between two coupling points, one of the coupling points comprising a joint part for discharging the driving force, which joint part, in the mounted state, forms a ball and socket joint with a mating joint part, the joint part having a bearing portion, a joining part arranged thereon and a connecting portion arranged thereon. The connecting portion serves for the connection of at least one drive train component of the linear drive to the joint part and has at least one connecting formation which is in engagement with the relevant drive train component, and wherein at least one part of the bearing
(Continued)

portion is configured integrally together with the joining part and the connecting portion from at least one plastics material.

19 Claims, 4 Drawing Sheets

(51) Int. Cl.
| | | |
|---|---|---|
| *F16F 9/54* | (2006.01) | |
| *F16F 1/12* | (2006.01) | |
| *F16F 13/00* | (2006.01) | |
| *F16F 9/32* | (2006.01) | |
| *E05F 15/622* | (2015.01) | |

(52) U.S. Cl.
CPC ............ *F16F 1/125* (2013.01); *F16F 9/3242* (2013.01); *F16F 9/54* (2013.01); *F16F 13/007* (2013.01); *E05Y 2900/531* (2013.01); *E05Y 2900/532* (2013.01); *E05Y 2900/536* (2013.01); *E05Y 2900/54* (2013.01); *E05Y 2900/542* (2013.01); *E05Y 2900/546* (2013.01); *F03G 2730/02* (2013.01)

(58) Field of Classification Search
CPC .. F16F 1/125; F16F 9/54; F16F 9/3242; F16F 13/007; B60G 7/005
See application file for complete search history.

(56) References Cited

U.S. PATENT DOCUMENTS

| | | | |
|---|---|---|---|
| 5,833,383 | A | 11/1998 | Bauman et al. |
| 7,384,209 | B2 * | 6/2008 | Muders ............... F16C 11/0614 |
| | | | 248/288.31 |
| 9,291,194 | B2 * | 3/2016 | Strobel ................ E05F 15/622 |

FOREIGN PATENT DOCUMENTS

| | | |
|---|---|---|
| FR | 2635154 | 9/1990 |
| GB | 2064640 | 6/1981 |
| GB | 2221496 | 2/1990 |
| JP | S5780747 | 5/1982 |

OTHER PUBLICATIONS

"Search Report," for German Patent Application No. 102014105956.5, dated Jun. 4, 2014 (7 pages), no translation available.

\* cited by examiner

LINEAR DRIVE FOR AN ADJUSTMENT ELEMENT OF A MOTOR VEHICLE

CROSS-REFERENCE TO RELATED APPLICATIONS

This application is a national stage application under 35 U.S.C. 371 of Inter-national Patent Application Ser. No. PCT/EP2015/055210, entitled "Linearantrieb fur ein Verstellelement eines Kraftfahrzeugs," filed Mar. 15, 2015, which claims priority from German Patent Application No. DE 10 2014 105 956.5, filed Apr. 29, 2014 the disclosure of which is incorporated herein by reference.

FIELD OF THE TECHNOLOGY

The disclosure relates to a linear drive for an adjustment element of a motor vehicle, to a joint part of a linear drive and to a method for producing a linear drive.

BACKGROUND

The term "adjustment element" should be understood here in broad terms. It comprises, for example, a tailgate, a rear cover, an engine hood, a side door, a luggage compartment flap, a rising roof or the like of a motor vehicle.

The known linear drive (DE 20 2011 109 569 U1), on which the invention is based, is configured as a spindle drive. It serves for the motorized adjustment of a motor vehicle adjustment element configured as a tailgate.

The known linear drive has a drive train with a drive motor for generating a driving force between two coupling points which each comprise a joint part. The joint parts of the linear drive have a bearing portion configured as a ball socket, a joining part arranged thereon and a connecting portion arranged thereon which is furthermore in engagement with the linear drive. A connecting portion is in engagement with one end of a guide tube which is connected at its other end to a spindle nut.

The mechanical stability of the joint part, in particular the stability of the engagement between the connecting portion and the guide tube, obtains particular importance in the case of the known linear drive in so far as a helical spring is provided which pushes the two coupling points of the linear drive apart under high pretensioning. In the event of a breakage of the joint part, in particular in the event of release of the engagement between the connecting portion and the guide tube, an abrupt movement apart of the two coupling points occurs. This undesirable operation can scarcely be controlled and entails corresponding destruction and injury risks, and therefore the configuration of bearing portion, joining part and connecting portion from steel has proven successful. However, this is associated with high material and production costs and with a relatively high component weight.

SUMMARY

The invention is based on the problem of configuring and further developing the known linear drive in such a manner that the material and production costs and the component weight are reduced without the operational reliability of the linear drive being impaired.

The above problem is solved in the case of a linear drive as described herein.

It is an essential consideration for the teaching according to the proposal that the basic constituent parts of the joint part under discussion can be configured integrally from at least one plastics material without the mechanical stability of the joint part being unduly impaired in respect of the driving forces which occur. In detail, the finding consists in that the integrity results in a structural stabilization of the joint part, from which a certain flexibility results in the selection of material for the joint part. It is accordingly proposed that the integral structure of the joint part is configured from at least one plastics material, such as from a single plastics material. The plastics material can be a polymer plastics material, in particular a POM or PA material.

With the solution according to the proposal, the material costs for the joint part can be kept low, given a suitable selection of material. Above all, however, the production costs can be reduced, in particular by the joint part being produced by plastics injection molding. Finally, the configuration of the joint part from a plastics material results in a considerable degree of freedom in the mechanical construction since structure-reinforcing measures can be used cost-effectively. In the simplest case, these include supporting ribs or the like.

Basically, it can be provided that, for the integrity of bearing portion, joining part and connecting portion, one and the same plastics material is used. However, it is also conceivable for different plastics materials to be used depending on the respective mechanical stressing.

In various embodiments, the connecting portion is provided with two connecting formations which are in engagement with different drive train components of the linear drive. This takes account of the fact that the drive train of the linear drive can have a plurality of drive train sections which act in parallel on the connecting portion.

In various embodiments, the advantage of the provision of the connecting portion with two connecting formations is demonstrated using the example of a linear drive configured as a spindle drive. It is possible according to the proposal to realize two connecting formations which are assigned to different drive train sections, namely to the drive train section of the drive motor and the drive train section of the spring arrangement. The integrity according to the proposal results in the high structural stability required here. This is advantageous in particular for the case in which the spring arrangement operates counter to the drive motor at least over a part of the motorized adjustment.

Various embodiments permit a comparatively weak design of the joint part since the spring arrangement generates a pretensioning force which brings about a pretensioning of the two coupling points toward each other. Even if the joint part were to break in the region of the joining part or in the region of the connecting portion, only an abrupt, spring-driven retraction of the linear drive should be expected. Such a retraction does not constitute a significant destruction or injury risk compared to an abrupt extension of the linear drive.

Various embodiment relate to a structurally advantageous refinement in which a connecting portion is assigned two connecting formations, namely a cylindrical connecting formation and an annular-collar-shaped connecting arrangement. The structural stability can be further increased by means of the connecting formations arranged concentrically with respect to each other.

A joint part of a linear drive is described herein. Reference should be made to all of the statements regarding the linear drive according to the proposal.

A method for producing a linear drive is described.

It is essential for the method according to the proposal that first of all the joining portion is produced together with the joining part and the connecting portion of the joint part, such as by plastics injection molding, and that, in a subsequent step, at least one drive train component of the linear drive is connected to the joint part via the connecting portion.

With the method according to the proposal, the joint part can be produced, for example, by plastics injection molding without any connecting parts having to be placed into the respective injection mold. This simplifies the production process.

Various embodiments show a particularly interesting design of the method according to the proposal. The connection of at least one drive train component to the connecting portion stems here from a deformation of the drive train component. Given a suitable configuration of the plastics material, particularly good joining between connecting formation and drive train component can thereby be realized.

An embodiment provides a linear drive for an adjustment element of a motor vehicle, with a drive train for generating a driving force along a geometrical drive axis between two coupling points, at least one of the coupling points comprising a joint part for discharging the driving force, which joint part, in the mounted state, forms a ball and socket joint with a mating joint part, the joint part having a bearing portion, in particular a ball socket, a joining part arranged thereon and a connecting portion arranged thereon, wherein the connecting portion serves for the connection of at least one drive train component of the linear drive to the joint part and, for this purpose, has at least one connecting formation which is in engagement with the relevant drive train component, and wherein at least one part of the bearing portion, in particular a ball socket housing, is configured integrally together with the joining part and the connecting portion from at least one plastics material.

In various embodiments, the bearing portion is configured integrally together with the joining part and the connecting portion from at least one plastics material.

In various embodiments, the connecting portion has two connecting formations which are each in engagement with a drive train component of the linear drive for the connection of said drive train components to the joint part.

In various embodiments, the two coupling points each have a joint part with a bearing portion.

In various embodiments, for a motorized adjustment of the adjustment element along the geometrical drive axis, the drive train has a drive motor with a spindle/spindle nut mechanism connected downstream.

In various embodiments, for generating a spring force along the geometrical drive axis (1a), the drive train has a spring arrangement, wherein the spring arrangement has a helical spring which is aligned with the geometrical drive axis.

In various embodiments, a motor force generated by the drive motor is introduced via a first connecting formation into the connecting portion, and wherein a spring force generated by the spring arrangement is introduced via a second connecting formation into the connecting portion.

In various embodiments, the spring arrangement generates a spring force which brings about a pretensioning of the two coupling points toward each other.

In various embodiments, at least one connecting formation is designed for the force-fitting and/or form-fitting connection of the relevant drive train component.

In various embodiments, the connection of a drive train component to the connecting portion stems from a deformation of the drive train component, wherein the connection of the connecting component stems from roller burnishing or crimping of the drive train component.

In various embodiments, at least one connecting formation has a form-fitting element for the form-fitting engagement with the associated drive train component, wherein the form-fitting element is a recess, in particular a groove, a screw thread, or the like.

In various embodiments, a drive train component which is connected to the joint part via the connecting portion is configured in a tubular manner at least in sections, wherein the drive train component is configured as a guide tube which is connected at one end to the connecting portion and on which at the other end a spindle nut of the spindle/spindle nut mechanism is arranged.

In various embodiments, a connecting formation is configured substantially cylindrically, and wherein the tubular drive train component surrounds at least one part of the connecting formation, wherein the connecting formation has at least one outer squeezing groove which is at least partially encircling with respect to the geometrical drive axis and into which the drive train component is deformed, in particular by means of roller burnishing or crimping, in order to produce a squeezing connection.

In various embodiments, a connecting formation of the connecting portion is at least partially configured in the shape of an annular collar.

In various embodiments, the cylindrical connecting formation is oriented concentrically with respect to the annular-collar-shaped connecting formation, furthermore wherein the cylindrical connecting formation adjoins the annular-collar-shaped connecting formation, as seen along the geometrical drive axis, furthermore wherein the bearing portion and the cylindrical connecting formation are arranged on opposite sides with respect to the annular-collar-shaped connecting formation.

In various embodiments, the drive train component associated with the annular-collar-shaped connecting formation is an adapter part for the spring arrangement, wherein the adapter part has a screw thread portion onto which a helical spring of the spring arrangement is screwed.

In various embodiments, the adjustment element is a tailgate, a rear cover, an engine hood, a side door, a luggage compartment flap, a rising roof or the like of a motor vehicle.

An embodiment provides a joint part for forming a ball and socket joint for discharging driving force of a linear drive, in particular of a linear drive as described herein, in which a bearing portion, in particular a ball socket, a joining part arranged thereon and a connecting portion arranged thereon are provided, wherein the connecting portion serves for the connection of at least one drive train component of the linear drive to the joint part and, for this purpose, has at least one connecting formation which can be brought into engagement with the relevant drive train component, and wherein at least one part of the bearing portion, in particular a ball socket housing, is configured integrally together with the joining part and the connecting portion from at least one plastics material.

In various embodiments, first of all the bearing portion is produced together with the joining part and the connecting portion of the joint part, such as by plastics injection molding, and wherein, in a subsequent step, at least one drive train component of the linear drive is connected to the joint part via the connecting portion.

In various embodiments, the connection of at least one drive train component to the connecting portion stems from a deformation of the drive train component, wherein the connection of the drive train component stems from roller burnishing or crimping of the drive train component.

BRIEF DESCRIPTION OF THE FIGURES

The invention is explained in more detail below with reference to a drawing which merely illustrates one exemplary embodiment. In the drawing.

DETAILED DESCRIPTION

Figure 1:
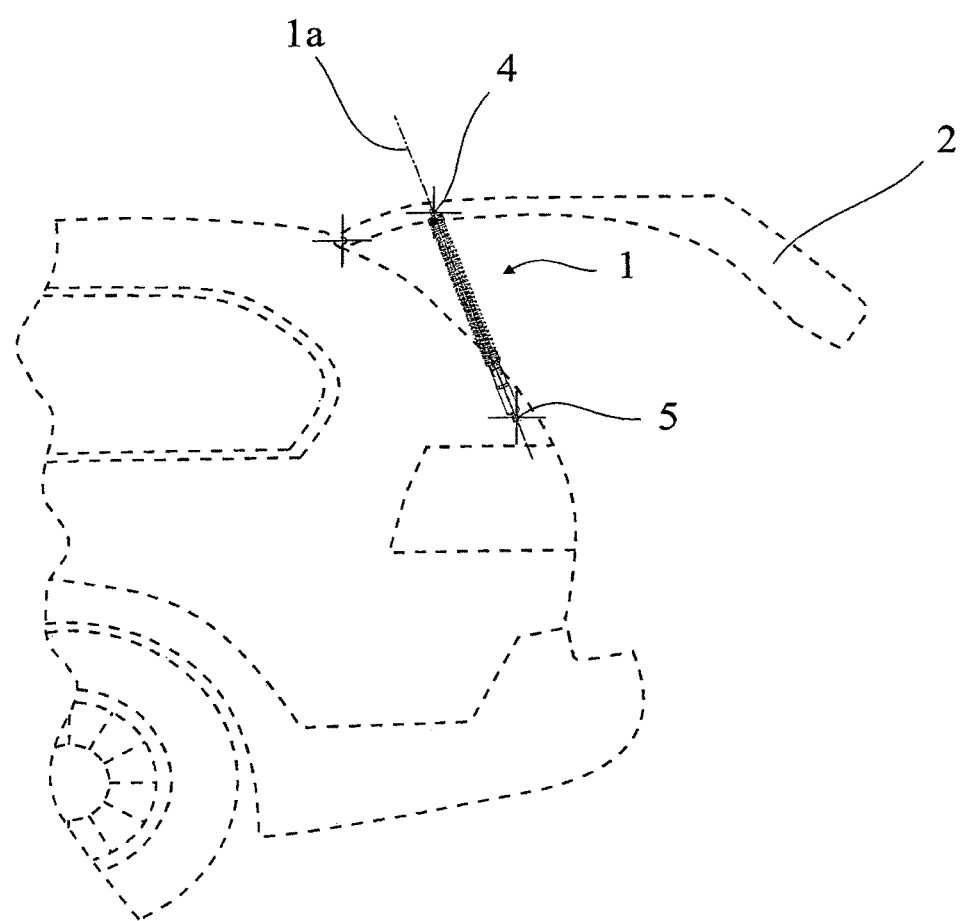
FIG. 1 shows, in a schematic side view, the rear of a motor vehicle with a linear drive according to the proposal.

The linear drive 1 illustrated in the drawing is configured in a manner yet to be explained as a spindle drive. It serves for the motorized adjustment of a pivotable motor vehicle adjustment element 2, configured here as a tailgate. Other regions of use of the spindle drive according to the proposal are conceivable, as explained in detail further below.

The linear drive 1 is assigned a drive train 3 for generating a driving force along the geometrical drive axis 1a between coupling points 4, 5. Owing to the fact that the linear drive 1 depicted has both a motorized and a spring-driven drive source, the drive train 3 here shows a first drive train section 3a and a second drive train section 3b. It should already be pointed out here that the linear drive 1 can be configured to be exclusively spring-driven, exclusively motor-driven or, as here, spring- and motor-driven.

At least one of the coupling points 4, 5 comprises a joint part 6 according to the proposal for discharging the driving force, which joint part, in the mounted state, forms a ball and socket joint with a mating joint part (not illustrated here). In the exemplary embodiment shown in FIG. 1, a mating joint part is arranged on the adjustment element 2, and a further mating joint part is arranged on the motor vehicle body.

Figure 2:
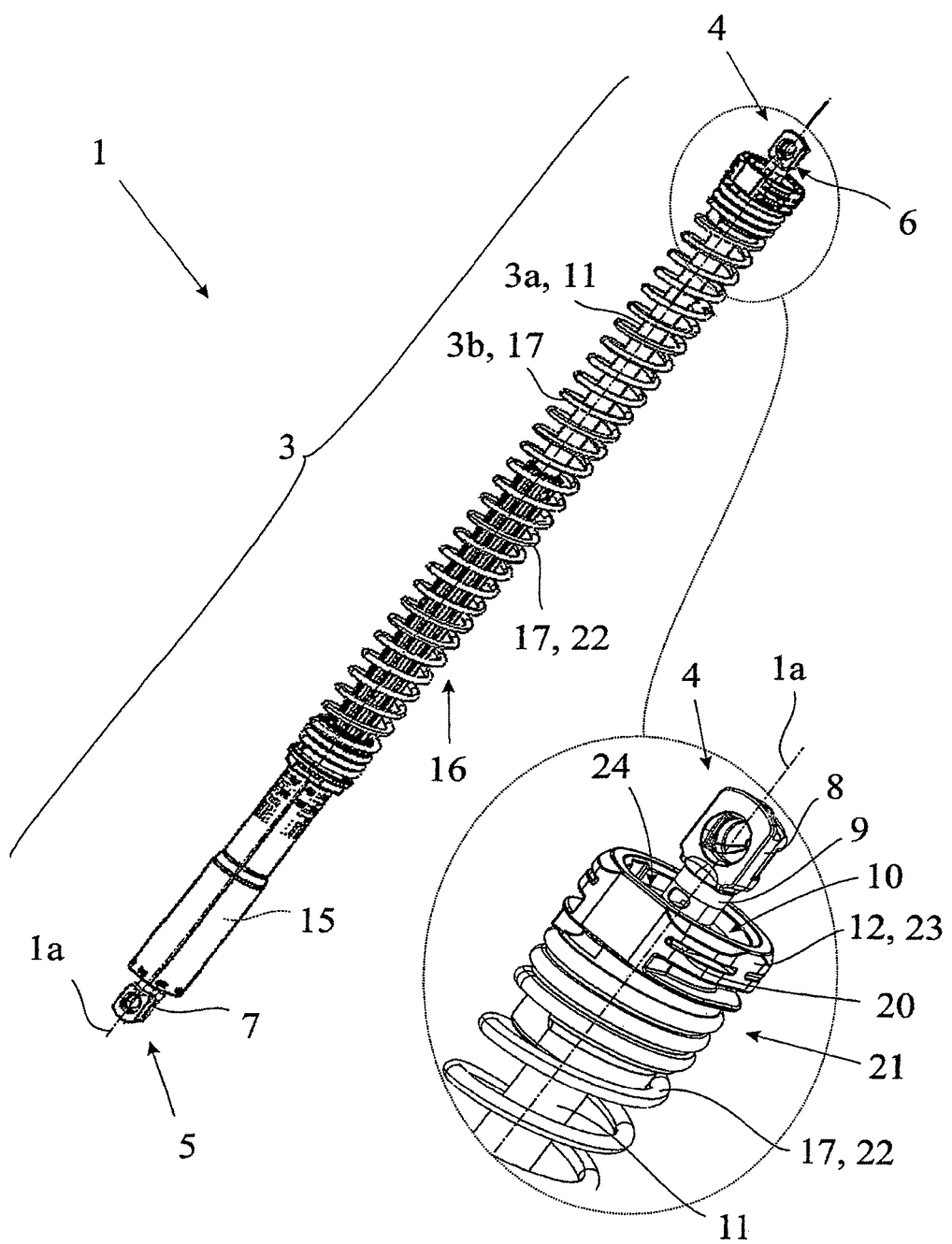
FIG. 2 shows the linear drive according to FIG. 1 in the dismounted state.

Only a single joint part 6, namely the upper joint part 6 in FIG. 2, is discussed below. All statements in this regard also relate correspondingly to the lower joint part 7 in FIG. 2.

Figure 3:
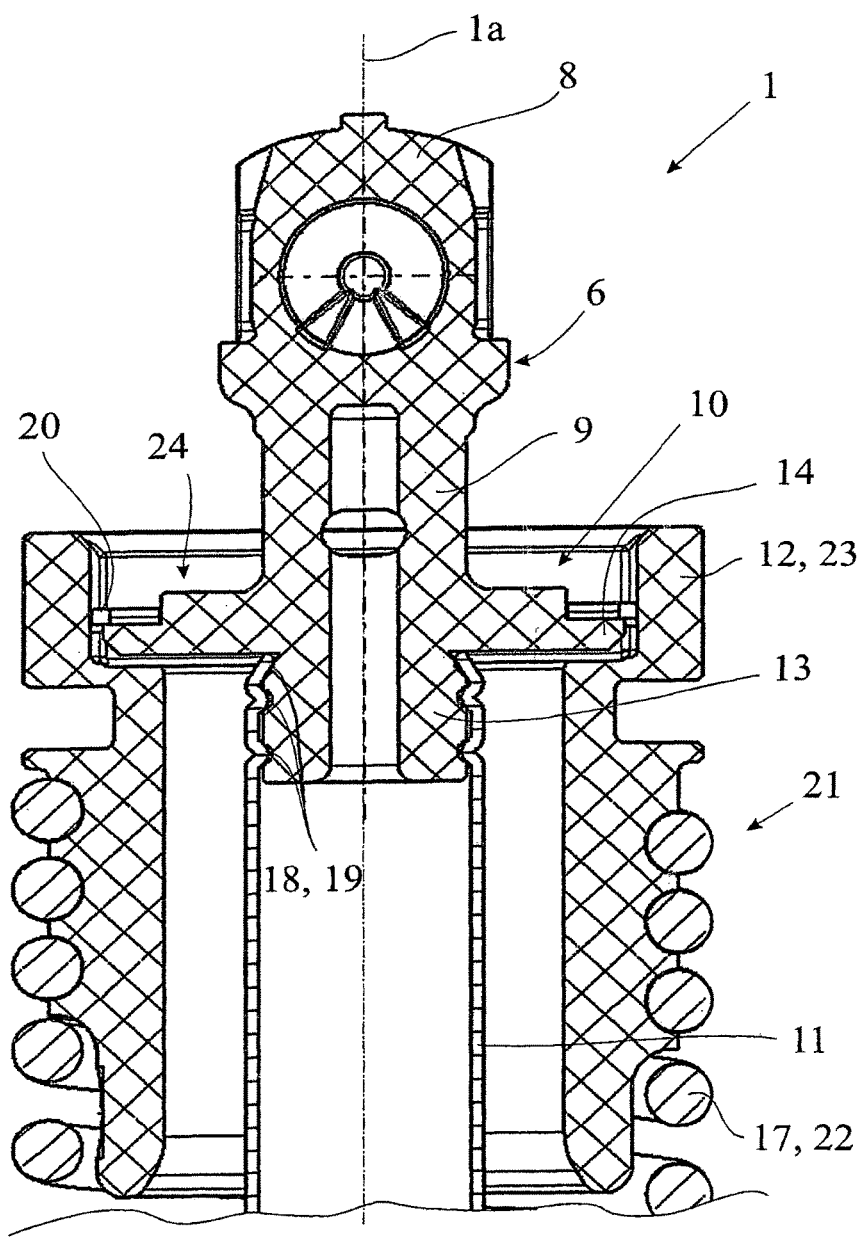
FIG. 3 shows the linear drive according to FIG. 2 in a longitudinal section.

The detailed view according to FIG. 2 shows that the joint part 6 has a bearing portion 8, here a ball socket. FIG. 2 furthermore shows that a joining part 9 is arranged on the bearing portion 8. FIG. 3 finally shows that a connecting portion 10 is arranged in turn on the joining part 9. The bearing portion 8, the joining part 9 and the connecting portion 10 are arranged one behind another here on the geometrical drive axis 1a.

It can be gathered from the illustration according to FIG. 3 that the connecting portion 10 serves for the connection of two drive train components 11, 12 of the linear drive 1 to the joint part 6. The drive train components 11, 12 are firstly the guide tube which is yet to be explained and an adapter part which has likewise yet to be explained. For the above connection of the drive train components 11, 12, the connecting portion 10 correspondingly has two connecting formations 13, 14 which are in engagement with the relevant drive train component 11, 12.

It can basically also be provided that the connecting portion 10 serves for the connection only of a single drive train component 11 of the linear drive 1 to the joint part 6 and that, for this purpose, accordingly only a single connecting formation 13 is provided. However, the integral configuration of the two connecting formations 13, 14 is of particularly high structural stability, as has been indicated further above.

Figure 4:
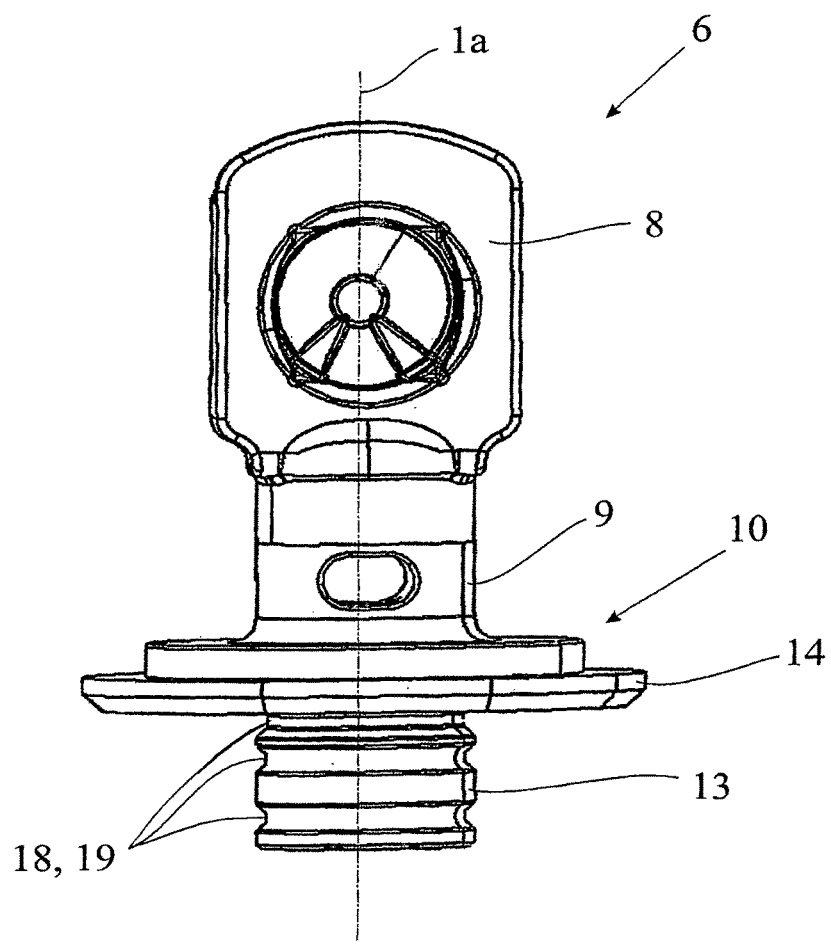
FIG. 4 shows the upper joint part of the linear drive according to FIG. 2 in the dismounted state.

An overall view of FIGS. 2 to 4 shows that the bearing portion 8 is configured integrally together with the joining part 9 and the connecting portion 10 from a single material. The material is a plastics material. It is also conceivable that use is made here of a plurality of plastics materials which can be used depending on the respective local loading of the joint part 6.

In principle, it is also possible for only one part of the bearing portion 8 to be configured integrally together with the joining part 9 and the connecting portion 10. It is then appropriate for a ball socket housing to be configured correspondingly integrally together with the joining part 9 and the connecting portion 10. The ball socket housing then accommodates the actual ball socket, wherein separate damping and fastening measures may be taken.

The joining part 9 provides a join between the bearing portion 8 and the connecting portion 10. It can be elongated and in particular cylindrical configuration.

It has already been pointed out that the connecting portion 10 has two connecting formations 13, 14 which are each in engagement with a drive train component 11, 12 of the linear drive 1 for the connection of said drive train components to the joint part 6. This basically also comprises an arrangement in which more than two connecting formations 13, 14 are provided.

As likewise discussed, the two connecting formations 13, 14 are assigned to two different drive train components 11, 12 which, in turn, are assigned to two separate drive train sections 3a, 3b of the drive train 3. As also explained, the two drive train components 11, 12 introduce opposite forces into the connecting portion 10, at least over a part of the motorized adjustment, and therefore the integral configuration according to the proposal of the joint part 6 is depicted as being particularly advantageous because of the structural stability associated therewith.

In principle, provision may be made for only one of the two coupling points 4, 5 to have a joint part 6 according to the proposal. However, here it is the case that the two coupling points 4, 5 of the linear drive 1 each have a joint part 6, 7 according to the proposal with a corresponding bearing portion 8.

Very generally, it can be the case that the linear drive 1 is of elongate configuration, and that the coupling points 4, 5 are arranged along the drive axis 1a on opposite end portions of the linear drive 1. The coupling points 4, 5 therefore determine the extension of the linear drive 1 along the drive axis 1a.

It has already been pointed out that the linear drive 1 can be designed exclusively in a spring-driven manner. However, here for a motorized adjustment of the adjustment element 2 along the geometrical drive axis 1a, the drive train 3 has a drive motor 15 with a spindle/spindle nut mechanism 16 connected downstream. An overall compact configuration can therefore be achieved.

In particular when the linear drive 1 is configured as a spindle drive, spring s pretensioning between the two coupling points 4, 5 can be realized in a particularly compact manner. According to FIG. 2, in order to generate a driving force along the geometrical drive axis 1a, the drive train 3 has a spring arrangement 17 which, here has a helical spring 22 which is aligned with the geometrical drive axis 1a.

Here, it is the case that a motor force generated by the drive motor 15 is introduced into the connecting portion 10 via a first connecting formation 13, while a spring force generated by the spring arrangement 17 is introduced into the connecting portion 10 via a second connecting formation 14.

In the exemplary embodiment which is illustrated, the spring arrangement 17 generates a spring force which brings about a pretensioning of the two coupling points 4, 5 and therefore of the two joint parts 6, 7 toward each other. It becomes clear here that the destruction or injury risk stemming from the spring arrangement 17 is low since, in the event of the joint part 6 breaking, an abrupt retraction of the linear drive 1 should at most be anticipated. Accordingly, a comparatively weak design of the joint part 6, in particular the configuration of the joint part 6 from a comparatively weak plastics material, is justifiable.

Numerous advantageous variants are conceivable for the design of the connecting formation 13, 14. At least one connecting formation 13, 14 can be designed for the force-fitting and/or form-fitting connection of the relevant drive train component 11, 12.

For the case of the force-fitting connection, the relevant connecting formation 13, 14 and/or the relevant drive train component 11, 12 are or can be provided with a certain elasticity, the elastic resetting force of which ensures a corresponding force fit. In the case of a form-fitting connection, the relevant connecting formation 13, 14 and/or the relevant drive train component 11, 12 are or is provided with a corresponding form-fitting element 18 which is yet to be explained.

Here, the connection of the drive train components 11, 12 to the connecting portion 10 stems from a deformation of the respective drive train component 11, 12. Roller burnishing or crimping of the respective drive train component 11, 12 is suitable here for the deformation.

For the form-fitting engagement with the associated drive train component 11, 12, at least one connecting formation 13, 14 is provided with an above-mentioned form-fitting element 18. The form-fitting element 18 can be, for example, a recess, in particular a groove illustrated in FIG. 3, a screw thread or the like.

FIG. 3 shows that a drive train component 11 which is connected to the joint part 6 via the connecting portion 10 is configured in a tubular manner at least in sections. Here, the relevant drive train component 11 is configured as an above-discussed guide tube that is connected at one end to the connecting portion 10 and on which at the other end a spindle nut (not illustrated) of the spindle/spindle nut mechanism 16 is arranged. Since the drive motor 15 here drives the spindle (likewise not illustrated) of the spindle/spindle nut mechanism 16, an activation of the drive motor 15 leads to a relative adjustment of the upper joint part 6 in FIG. 2 in relation to the lower joint part 7 in FIG. 2. This adjustment is transmitted from the spindle nut to the connecting formation 13 via the drive train component 11 configured as a guide tube. A particularly advantageous connection of the drive train component 11, which is configured as a guide tube, to the connecting portion 10 consists in that the relevant connecting formation 13 is configured to be substantially cylindrical, wherein the tubular drive train component 11 surrounds at least a part of the connecting formation 13, here the entire connecting formation 13.

For the engagement between the drive train component 11 and the connecting formation 13, the connecting formation 13 is provided with at least one outer squeezing groove 19 which is at least partially encircling with respect to the geometrical drive axis 1$a$ and into which the drive train component 11 is deformed, here by means of roller burnishing or crimping, in order to produce a squeezing connection. This can likewise be gathered from the illustration according to FIG. 3.

The above squeezing groove 19 is a form-fitting element 18 in the above sense. Here, at least two squeezing grooves 19, in particular three squeezing grooves 19, are provided. In principle, the arrangement of a plurality of squeezing grooves arranged in an offset manner is conceivable.

The connection of the drive train component 11 to the connecting formation 13 is a combination of a form-fitting connection and a force-fitting connection. The form-fitting connection arises from the intermeshing of the squeezing groove 19 and of that part of the drive train component 11 which is deformed into the squeezing groove 19. The force-fitting connection arises from the elasticities of the two components which are in engagement with each other.

The configuration of the further connecting formation 14 can be gathered from an overall view of FIGS. 3 and 4. The connecting formation 14 here is configured at least partially in the shape of an annular collar. As illustrated in FIGS. 3 and 4, the annular-collar-shaped connecting formation 14 is oriented concentrically with respect to the drive axis 1$a$.

An overall view of FIGS. 3 and 4 furthermore reveals that the cylindrical connecting formation 13 is oriented concentrically with respect to the annular-collar-shaped connecting formation 14. Here, it is the case that the cylindrical connecting formation 13 adjoins the annular-collar-shaped connecting formation 14, as seen along the geometrical drive axis 1$a$. Furthermore, the annular-collar-shaped connecting formation 14 protrudes here beyond the cylindrical connecting formation 13, with respect to the geometrical drive axis 1$a$. The bearing portion 8 and the cylindrical connecting formation 13 are arranged here on opposite sides with respect to the annular-collar-shaped connecting formation 14.

Here, the drive train component 12 associated with the annular-collar-shaped connecting formation 14 is connected to the connecting formation 14 in a form-fitting manner. Said form-fitting connection is locked, as illustrated in FIG. 3, via a snap-ring-like clamp 20.

The drive train component 12 associated with the annular-collar-shaped connecting formation 14 is an adapter part 23 for the spring arrangement 17. Here, the adapter part 23 has a screw thread portion 21 onto which a helical spring 22 of the spring arrangement 17 is screwed. As shown in FIG. 2, a corresponding adapter part 23 is found at the lower end of the helical screw 22. For the above-mentioned, form-fitting engagement with the annular-collar-shaped connecting formation 14, the adapter part 23 is provided with a recess 24 into which the annular-collar-shaped connecting formation 14 is inserted and locked by means of the above-mentioned clamp 20.

The linear drive 1 according to the proposal and configured in particular as a spindle drive is usable for all possible adjustment elements 2 of a motor vehicle. Mentioned here as examples are the above-explained tailgate, a rear cover, an engine hood, a side door, a loading compartment flap, a rising roof or the like of a motor vehicle.

According to a further teaching, the above-discussed joint part 6 of a linear drive 1 is described. Reference may be made to all of the statements with regard to the linear drive 1 according to the proposal.

A method for producing a linear drive 1 according to the proposal is described.

It is essential here that first of all the bearing portion 8 is produced together with the joining part 9 and the connecting portion 10, here by plastics injection molding, and that, in a subsequent step, at least one drive train component 11, 12 of the linear drive 1 is connected to the joint part 6 via the connecting portion 10.

In an embodiment, the connection of at least one drive train component 11, 12, here the drive train component 12 associated with the cylindrical connecting formation 13, stems from a deformation of the drive train component 12. Here, the connection of the relevant drive train component 11 stems from roller burnishing or crimping of the relevant drive train component 11. Reference may be made to all of the above statements which are suitable for explaining the production of the linear drive 1.

The invention claimed is:

1. A linear drive for an adjustment element of a motor vehicle, with a drive train for generating a driving force along a geometrical drive axis between two coupling points, at least one of the coupling points comprising a joint part for discharging the driving force, wherein the joint part, in the mounted state, forms a ball and socket joint with a mating joint part, the joint part having a bearing portion, a joining part arranged thereon and a connecting portion arranged thereon, wherein the connecting portion serves for the connection of at least one drive train component of the linear drive to the joint part and, for this purpose, has at least one connecting formation which is in engagement with the at least one drive train component, and wherein at least one part of the bearing portion is configured integrally together with the joining part and the connecting portion from at least one plastics material.

2. The linear drive as claimed in claim 1, wherein the bearing portion is configured integrally together with the joining part and the connecting portion from at least one plastics material.

3. The linear drive as claimed in claim 1, wherein the connecting portion has two connecting formations which are each in engagement with the at least one drive train component of the linear drive for the connection of the at least one drive train components to the joint part.

4. The linear drive as claimed in claim 1, wherein the two coupling points each have a joint part with a bearing portion.

5. The linear drive as claimed in claim 1, wherein, for a motorized adjustment of the adjustment element along the geometrical drive axis, the drive train has a drive motor with a spindle/spindle nut mechanism connected downstream.

6. The linear drive as claimed in claim 5, wherein, for generating a spring force along the geometrical drive axis, the drive train has a spring arrangement.

7. The linear drive as claimed in claim 6, wherein a motor force generated by the drive motor is introduced via a first connecting formation into the connecting portion, and wherein a spring force generated by the spring arrangement is introduced via a second connecting formation into the connecting portion.

8. The linear drive as claimed in claim 6, wherein the spring arrangement generates a spring force which brings about a pretensioning of the two coupling points toward each other.

9. The linear drive as claimed in claim 6, wherein the at least one connection formation of the connecting portion is at least partially configured in the shape of an annular collar.

10. The linear drive as claimed in claim 9, wherein a cylindrical connecting formation is oriented concentrically with respect to the annular-collar-shaped connecting formation.

11. The linear drive as claimed in claim 9, wherein the drive train component associated with the annular-collar-shaped connecting formation is an adapter part for the spring arrangement.

12. The linear drive as claimed in claim 1, wherein at least one connecting formation is designed for the force-fitting and/or form-fitting connection of the at least one drive train component.

13. The linear drive as claimed in claim 1, wherein the connection of the at least one drive train component to the connecting portion stems from a deformation of the drive train component.

14. The linear drive as claimed in claim 1, wherein at least one connecting formation has a form-fitting element for the form-fitting engagement with the associated drive train component.

15. The linear drive as claimed in claim 1, wherein the at least one drive train component which is connected to the joint part via the connecting portion is configured in a tubular manner at least in sections.

16. The linear drive as claimed in claim 15, wherein the at least one connection formation is configured substantially cylindrically, and wherein the tubular drive train component surrounds at least one part of the connecting formation.

17. The linear drive as claimed in claim 1, wherein the adjustment element is a tailgate, a rear cover, an engine hood, a side door, a luggage compartment flap, a rising roof or the like of a motor vehicle.

18. A method for producing the linear drive as claimed in claim 1, comprising producing the bearing portion together with the joining part and the connecting portion of the joint part and connecting, in a subsequent step, the at least one drive train component of the linear drive to the joint part via the connecting portion.

19. The method as claimed in claim 18, wherein the connection of the at least one drive train component to the connecting portion stems from a deformation of the drive train component.

* * * * *